United States Patent [19]

Furukawa et al.

[11] Patent Number: 4,521,587

[45] Date of Patent: Jun. 4, 1985

[54] COMPOSITION FOR TREAD RUBBER OF TIRES

[75] Inventors: Hiroshi Furukawa, Kobe; Yuichi Saito, Nishinomiya, both of Japan

[73] Assignees: Sumitomo Rubber Industries, Ltd., Kobe; Sumitomo Chemical Company, Limited, Osaka, both of Japan

[21] Appl. No.: 576,799

[22] Filed: Feb. 6, 1984

Related U.S. Application Data

[63] Continuation of Ser. No. 496,913, May 23, 1983, abandoned, which is a continuation of Ser. No. 324,547, Nov. 24, 1981, abandoned.

[30] Foreign Application Priority Data

Dec. 2, 1980 [JP] Japan .............................. 55-170647

[51] Int. Cl.$^3$ ........................................... C08F 136/08
[52] U.S. Cl. ................................................. 526/340.2
[58] Field of Search ...................................... 526/340.2

[56] References Cited

U.S. PATENT DOCUMENTS

| | | | |
|---|---|---|---|
| 3,448,095 | 6/1969 | Dawans et al. | 526/340.2 |
| 3,480,607 | 11/1969 | Hsieh | 526/340.2 |
| 3,491,078 | 1/1970 | Dawans | 526/340.2 |
| 3,597,407 | 8/1971 | Hsieh | 526/340.2 |
| 3,726,832 | 4/1973 | Komatsu et al. | 526/340.2 |
| 4,116,887 | 9/1978 | Lehn et al. | 526/340.2 |

*Primary Examiner*—Paul R. Michl
*Attorney, Agent, or Firm*—Armstrong, Nikaido, Marmelstein & Kubovcik

[57] ABSTRACT

A composition for tread rubber of tires containing a synthetic isoprene rubber having a 3,4-bonding content of at least 15% by mole and an intrinsic viscosity of at least 2.0 in toluene at 30° C. The composition can provide a rubber having an improved frictional characteristic on wet road with an excellent rolling resistance characteristic, and is very useful as a tread rubber of tires.

2 Claims, No Drawings

COMPOSITION FOR TREAD RUBBER OF TIRES

This application is a continuation of application Ser. No. 496,913, filed May 23, 1983, now abandoned which is a continuation of application Ser. No. 324,547, filed Nov. 24, 1981, now abandoned.

BACKGROUND OF THE INVENTION

The present invention relates to a composition for a tread rubber of tires having a low rolling resistance and an improved wet grip characteristic, and more particularly to a rubber composition containing a synthetic isoprene rubber having specified 3,4-bonding content and intrinsic viscosity.

In recent years, reduction of running fuel cost of automobiles such as passenger cars is strongly demanded in the automobile industry from the viewpoint of the economical efficiency and energy saving. There is mentioned the rolling resistance of tires as one factor participating in such a running fuel cost. It is known that the rolling resistance of tires is caused by energy losses in rubbers and codes of respective portions of the tires due to repeated deformation of the tires, and in particular the energy losses in a tread rubber largely participate in the rolling resistance. Therefore, in order to reduce the rolling resistance caused by the tread rubber, it is necessary to reduce the energy losses due to various repeated deformations, i.e. compressive deformation, bending deformation and shearing deformation, that the tread rubber incurs in running. Seeing it from the dynamic viscoelasticity of a rubber, this means that it is necessary to reduce the loss compliance [$E''/(E^*)^2$ in which $E''$ is loss modulus and $E^*$ is complex modulus] with respect to the energy loss due to compressive deformation and to reduce the loss modulus ($E''$) with respect to the energy losses due to bending and shearing deformations. Therefore, the use of natural rubber and synthetic cis-isoprene rubber which have generally a low loss compliance and a low loss modulus is advantageous in rolling resistance. However, these rubbers have the defect of being poor in the frictional characteristic on a wet road (hereinafter referred to as "wet grip" characteristic) which is the most important characteristic for tires of automobiles.

SUMMARY OF THE INVENTION

It has now been found that a synthetic isoprene rubber having specified 3,4-bonding content and intrinsic viscosity can improve the wet grip characteristic, while maintaining excellent characteristics such as low rolling resistance as obtained by the synthetic cis-isoprene rubber conventionally used as a tread rubber.

In accordance with the present invention, there is provided a composition for tread rubber of tires containing as a rubber component a synthetic isoprene rubber having a 3,4-bonding content of at least 15% by mole and an intrinsic viscosity [$\eta$] of at least 2.0 in toluene at 30° C.

DETAILED DESCRIPTION

The synthetic isoprene rubber having a 3,4-bonding content of at least 15% by mole (hereinafter referred to as "3,4-isoprene rubber") used in the present invention can be prepared by a solution polymerization process known as a living anionic polymerization process in which isoprene monomer is polymerized by using as a polymerization catalyst an alkali metal such as sodium or potassium, or an organometallic compound of the alkali metals. Hydrocarbon solvents such as hexane, heptane, cyclohexane and benzene are employed as a polymerization solvent in the same manner as a usual solution polymerization.

In the polymerization, it is also possible to use as the above-mentioned polymerization catalyst a combined catalyst system of lithium or an organolithium compound with a Lewis base such as ethers or tertiary amines. In that case, since the 3,4-bonding content of a polymer increases with increase of the proportion of the Lewis base to the lithium or organolithium compound, the 3,4-bonding content can be controlled by altering the proportion between the both substances.

The polymerization temperature is suitably selected from the temperature range adopted in a usual solution polymerization, e.g. from 20° to 200° C. The 3,4-bonding content in the produced polymer tends to decrease with the rise of the polymerization temperature. Therefore, the control of the 3,4-bonding content in the polymer can be made by suitably adjusting the proportion in the above-mentioned binary catalyst system or the polymerization temperature.

It is necessary that the 3,4-isoprene rubber used in the present invention has a 3,4-bonding content of at least 15% by mole. When the 3,4-bonding content is less than 15% by mole, it is difficult to improve the wet grip characteristic. With the increase of the 3,4-bonding content, the grip characteristic is increasingly improved, but in contrast with this the abrasion resistance of the rubber is decreased. Therefore, the 3,4-isoprene rubber having a 3,4-bonding content of 25 to 50% by mole is particularly preferred in consideration of the balance between the both characteristics.

It is further necessary that the 3,4-isoprene rubber has an intrinsic viscosity [$\eta$] of at least 2.0 in toluene at 30° C. The energy loss of the cured product of a composition containing the 3,4-isoprene rubber, in other words, the loss compliance [$E''/(E^*)^2$] and the loss modulus ($E''$), depend on the molecular weight of the 3,4-isoprene rubber, i.e. the intrinsic viscosity of the rubber, and the larger the molecular weight, namely the larger the intrinsic viscosity, the smaller the energy loss. When the intrinsic viscosity is 2.0 (in toluene at 30° C.), the energy loss is on the same level as that of natural rubber. Taking the processability of the rubber into consideration, it is desirable that the intrinsic viscosity of the 3,4-isoprene rubber is less than 4.0 (in toluene at 30° C.). Particularly, the 3,4-isoprene rubber having an intrinsic viscosity of 2.5 to 3.5 (in toluene at 30° C.) is preferably employed as a rubber component in the present invention. On the other hand, the increase of the intrinsic viscosity increases the abrasion resistance, but hardly affects on the wet grip characteristic.

In the present invention, the above-mentioned 3,4-isoprene rubber may be employed as a rubber component singly or in admixture with one or more kinds of other rubbers, e.g. natural rubber and synthetic rubbers such as cis-isoprene rubber, styrene-butadiene rubber and butadiene rubber. In case of using the 3,4-isoprene rubber with other rubbers, it is desirable that the proportion of the 3,4-isoprene rubber is more than 20% by weight based the whole rubber components.

The composition for tread rubber of the present invention is prepared by admixing the 3,4-isoprene rubber with additives usually used for a tread rubber, e.g. a filler, a softener, an antioxidant, a curing agent, a curing accelerator, and the like, according to a usual formulation for a tread rubber composition.

The composition for tread rubber of the present invention can satisfy both characteristics of the rolling resistance and the wet grip characteristic together, and moreover can maintain the abrasion resistance on the same level as that of a conventional tread rubber. The composition of the invention is adoptable in tires of all kinds of vehicles such as trucks and buses as well as radial tires for passenger cars particularly for which low fuel consumption is strongly demanded in recent years.

The present invention is more specifically described and explained by means of the following Examples, in which all parts are by weight unless otherwise noted. These Examples are intended to illustrate the invention and are not to be understood to limit the scope of the invention. Also, it is to be understood that various changes and modifications may be made in the invention without departing from the spirit and scope thereof.

EXAMPLES 1 AND 2 AND COMPARATIVE EXAMPLES 1 TO 4

Various tread rubber compositions were prepared by admixing a rubber component shown in Table 1 with additives according to the following formulation. The compositions were press-cured at 150° C. by employing a steam press of 150 tons to give cured products.

| Component | Amount (part) |
|---|---|
| Rubber | 100 |
| Carbon black N 339 (commercial name "Showblack" made by SHOWA DENKO K.K.) | 50 |
| Aromatic oil | 9 |
| Wax | 2 |
| N—Isopropyl-N'—phenyl-p-phenylenediamine (antioxidant) (commercial name "Antigen-3C" made by Sumitomo Chemical Co., Ltd.) | 2 |
| Stearic acid | 1 |
| Zinc oxide | 3 |
| Sulfur | 1.75 |
| N—cyclohexyl-2-benzothiazyl-sulfenamide (curing accelerator) | 1 |

The viscoelasticity of the rubber component and the rolling resistance index, wet grip index and abrasion resistance index of the cured product were measured.

In Comparative Examples, conventionally used rubbers were employed as a rubber component. Comparative Example 1 shows a representative example of a composition for radial tires of passenger cars which has been generally employed hitheto and which is excellent in wet grip characteristic. Comparative Example 2 shows a representative example of a composition which is formulated so as to largely decrease the rolling resistance with restraining the lowering of the wet grip characteristic as small as possible. Comparative Example 3 shows an example of a composition containing natural rubber which has hitherto been known to be the most excellent in the rolling resistance characteristic. Comparative Example 4 shows a general example in the case using a butadiene rubber.

The results are shown in Table 1.

The measurements were conducted as follows:

Viscoelasticity:

The viscoelasticity was measured by a viscoelasticity spectrometer made by Kabushiki Kaisha Iwamoto Seisakusho on specimens having a length 30 mm., a width of 4 mm. and a thickness of 2 mm. under conditions; initial strain of 10%, frequency of 10 Hz, amplitude of 2.0% and temperature of 70° C.

Rolling resistance index:

Nearly half of the rolling resistance of a tire is caused by the energy loss of a tread rubber. Particularly, with respect to a tread rubber, in case of ordinary running, about 75% of the total energy loss is concerned with the loss modulus (E") and about 25% of the total energy loss is concerned with the loss compliance [E"/(E*)$^2$]. In the light of this fact, the rolling resistance has been shown as an index according to the following equation:

$$\text{Rolling resistance index} = 75 \times \frac{\text{loss modulus of rubber to be compared}}{\text{loss modulus of standard rubber}} + 25 \times \frac{\text{loss compliance of rubber to be compared}}{\text{loss compliance of standard rubber}}$$

in which the composition of Comparative Example 1 is employed as a standard rubber. The smaller the rolling resistance index, the more excellent the rolling resistance characteristic.

Wet grip index:

A frictional resistance on a wet road was measured by employing a portable skid resistance tester. The wet grip characteristic has been expressed as a relative value of the frictional resistance on the basis of the composition of Comparative Example 1. The larger the wet grip index, the more excellent the wet grip characteristic.

Abrasion resistance index:

Abrasion test was conducted by employing a pico type abrasion machine under a loading of 4.5 kg.f. and at a number of rotation of 60 r.p.m. Twenty rotations in one direction were alternately repeated 80 times. The abrasion resistance has been shown as a relative value of the abrasion loss on the basis of the composition of Comparative Example 1. The larger the abrasion resistance index, the more excellent the abrasion resistance.

TABLE 1

| | Com. Ex. 1 | Com. Ex. 2 | Com. Ex. 3 |
|---|---|---|---|
| Rubber component (part) | | | |
| Styrene-butadiene rubber*$^1$ | 100 | 50 | — |
| Natural rubber | — | 50 | 100 |
| Butadiene rubber*$^2$ | — | — | — |
| 3,4-Isoprene rubber | — | — | — |
| 3,4-Bonding content (mole %) | — | — | — |
| Intrinsic viscosity | — | — | — |
| Viscoelasticity | | | |
| Loss modulus (kg./cm.$^2$) | 19.0 | 15.4 | 13.6 |
| Loss compliance (kg./cm.$^2$)$^{-1}$ | 2.62 × 10$^{-3}$ | 2.89 × 10$^{-3}$ | 2.59 × 10$^{-3}$ |
| Rolling resistance index | 100 | 88 | 78 |
| Wet grip index | 100 | 99 | 92 |
| Abrasion resistance index | 100 | 90 | 62 |

| | Com. Ex. 4 | Ex. 1 | Ex. 2 |
|---|---|---|---|
| Rubber component (part) | | | |
| Styrene-butadiene rubber*$^1$ | 50 | — | — |
| Natural rubber | — | — | — |
| Butadiene rubber*$^2$ | 50 | — | — |
| 3,4-Isoprene rubber | — | 100 | 100 |
| 3,4-Bonding content (mole %) | — | 25 | 31 |
| Intrinsic viscosity | — | 2.50 | 3.15 |
| Viscoelasticity | | | |

TABLE 1-continued

| | | | |
|---|---|---|---|
| Loss modulus (kg./cm.$^2$) | 15.7 | 13.2 | 11.0 |
| Loss compliance (kg./cm.$^2$)$^{-1}$ | 2.34 × 10$^{-3}$ | 3.01 × 10$^{-3}$ | 2.89 × 10$^{-3}$ |
| Rolling resistance index | 84 | 81 | 71 |
| Wet grip index | 80 | 116 | 120 |
| Abrasion resistance index | 126 | 95 | 90 |

(Notes)
*$^1$Styrene-butadiene rubber (commercial name "SBR 1500" made by Sumitomo Chemical Co., Ltd.)
*$^2$Butadiene rubber (commercial name "Ubepole 150" made by Ube Industries, Ltd.)

As is clear from Table 1, the compositions of the present invention (Examples 1 and 2) have an excellent wet grip characteristic which has never been attained by conventional compositions, in addition that they shows an excellent rolling resistance characteristic on the same or higher level with that of Comparative Example 3 which has the most excellent rolling resistance characteristic among conventional compositions. Also, the compositions of the present invention have an excellent abrasion resistance on the same level with those of Comparative Examples 1 and 2 which are general compositions used conventionally. Accordingly, it is understood that the compositions of the present invention can be suitably adopted as a tread rubber

What we claim is:

1. A tire having a tire tread portion, said tire tread portion being a rubber obtained by curing a rubber composition consisting essentially of (a) a minor amount of a tire tread rubber additive, and (b) a major amount of a synthetic isoprene rubber having a 3,4-bonding content of 25–50% by mol and an intrinsic viscosity of at least 2.0 in toluene at 30° C.

2. The tire of claim 1, wherein said synthetic isoprene rubber has an intrinsic viscosity of from not less than 2.5 to less than 0.4 in toluene at 30° C.

* * * * *